Dec. 16, 1969    T. LAHTI    3,484,117
PONY SOLDIER SEAT
Filed June 11, 1968
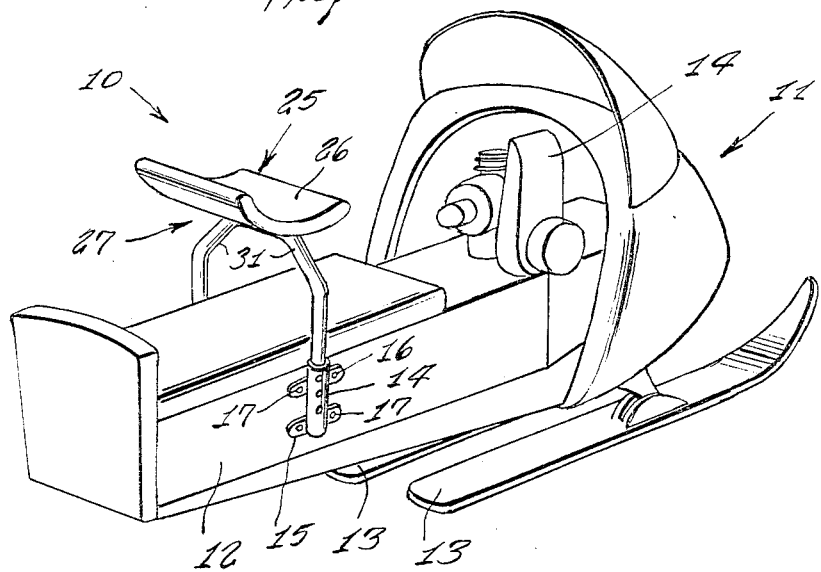
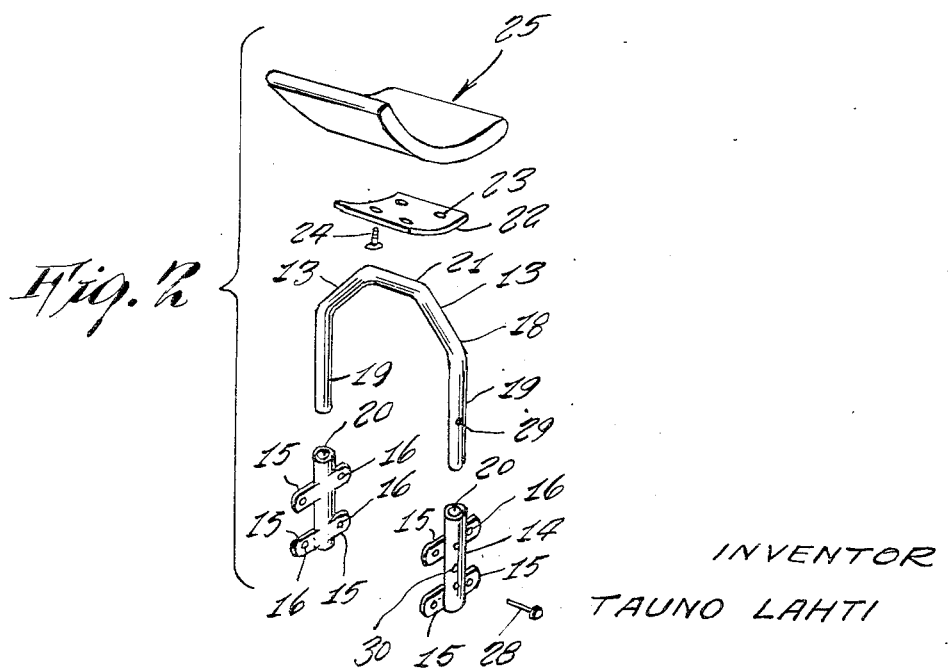
INVENTOR
TAUNO LAHTI

United States Patent Office 3,484,117
Patented Dec. 16, 1969

3,484,117
PONY SOLDIER SEAT
Tauno Lahti, Rte. 1, Box 333, Negaunee, Mich. 49866
Filed June 11, 1968, Ser. No. 736,075
Int. Cl. A63c 5/08, 11/00
U.S. Cl. 280—12                                        2 Claims

ABSTRACT OF THE DISCLOSURE

A seat for snowmobiles which permits easier handling of the machine and provides a handhold for a passenger in back, the seat comprising a vinyl covered seating panel secured to the upper end of a U-shaped pipe having downwardly extending legs which are mounted at their lower ends upon brackets bolted to the sides of the snowmobile body.

---

This invention relates generally to snowmobiles. More specifically it relates to a seat for a snowmobile.

A principal object of the present invention is to provide a seat which is readily adaptable to all makes of snowmobiles and which will permit easier handling of the machine.

Another object of the present invention it to provide a pony soldier seat which will serve as a handhold for a passenger riding in back thereof.

Yet a further object is to provide a pony soldier seat which will eliminate the causing of sore knees and sore arms and back.

Yet a further object of the present invention is to provide a pony soldier seat which is easily attachable and detachable from the machine.

Yet a further object is to provide a pony soldier seat which is readily adjustable in height so as to accommodate all size of operators.

Other objects of the present invention are to provide a pony soldier seat which is simple in design, inexpensive to manufacture, rugged in construction, easy to use and efficient in operation.

These and other objects will be readily evident upon a study of the following specification and the accompanying drawing wherein:

FIG. 1 is a perspective view of a snowmobile shown incorporating the present invention; and FIG. 2 is an exploded perspective view of the components comprising the present invention.

Referring now to the drawing in detail, the reference numeral 10 represents a pony soldier seat according to the present invention which is secured to a snowmobile 11.

The snowmobile 11 includes a body 12 mounted upon a pair of skiis 13, the body carrying a power plant 14.

In the present form of the invention, the snowmobile 11 is provided with a bracket 14 secured to each opposite side of the body 12, each bracket comprising a tubular sleeve having sidewardly extending wings 15 each of which has an opening 16 therethrough for the purpose of receiving a screw or bolt 17 for securement of the bracket to the side of the body.

A U-shaped frame 18 made of pipe includes parallel spaced apart legs 19 the lower ends of which are receivable into opening 20 in each of the brackets 14, the frame including an interconnecting horizontal portion 21 at the upper ends of the legs 19, the horizontal portion 21 being placed adjacent the upper side of an arched plate 22 to the underside of which is welded securely. The plate 22 includes a plurality of openings 23 extending therethrough for purpose of receiving upwardly extending screws 24 which are secured into the lower side of a seat 25. The seat 25 comprises an arched member formed of a wooden base supporting a foam rubber or foam plastic pad thereupon, the pad being enclosed by a vinyl cover 26 so as to prevent snow or water to gain access therethrough.

In operative use, the seat unit 27 comprised of the seat 25 rigidly affixed to the plate 22 and frame 18 is readily attachable and detachable from the snowmobile body by means of removal of a pin 28 which interconnects opening 29 in each leg 19 selectively with one of the openings 30 in spaced apart relation along the bracket sleeve. The spaced apart openings 30 accordingly provide a height adjustment for the seat so as to be readily adaptable for either short or tall persons as required. In operative use, an operator may sit upon the seat 25 while a passenger seated upon the rear end of body 12 of the snowmobile my hold with his hands to the angularly inclined portions 31 of the frame 18.

While various changes may be made in the detailed construction, it is understood that such changes will be within the spirit and scope of the present invention.

I claim:

1. In a pony soldier seat for a snowmobile, the combination of a seat assembly comprised of a pair of supporting brackets, means for securement of said brackets to said snowmobile, a U-shaped frame vertically adjustably supported in said brackets, and a seating member secured to said frame, each of said supporting brackets comprising a tubular sleeve having a central opening therethrough, said tubular sleeve having a plurality of sidewardly extending wings, each of said wings having a central opening therethrough, each of said openings receiving a screw for securement of said bracket to said snowmobile, said snowmobile including a body mounted upon a pair of skis, said body including vertical opposite side walls to each of which said brackets are secured, and said body having a rearwardly extending portion rearward of said bracket so to provide seating means for a passenger, said U-shaped bracket including a pair of spaced apart vertically extending legs, the lower end of said legs being receivable within said openings of said brackets, the upper portion of said frame including a horizontally extending section welded to the under side of an arcuate plate, said arcuate plate having a plurality of openings therethrough receiving screws, said screws being mountable within the underside of a seat comprised of an arcuate wooden base supporting a foam material pad thereabove, said pad and wooden base being enclosed within a vinyl cover.

2. The combination as set forth in claim 1 wherein each of said brackets includes a plurality of vertically spaced apart openings therethrough for selective alignment with a single opening in each of said legs, said opening in said leg and a selected one of said openings in each said bracket receiving a pin therethrough for providing vertical adjustment.

References Cited

UNITED STATES PATENTS

| 1,082,423 | 12/1913 | Hartman | 297—195 |
| 2,530,544 | 11/1950 | Schwantes. | |
| 2,851,275 | 9/1958 | Sheppard | 280—1.188 |
| 3,130,968 | 4/1964 | De Feen | 272—58 |
| 3,213,955 | 10/1965 | Hetteen. | |

OTHER REFERENCES

Ski-Bob (by Ski-Bob Inc., Stratford, Conn.), received on Mar. 10, 1966.

LEO FRIAGLIA, Prmary Examiner

ROBERT R. SONG, Assistant Examiner

U.S. Cl. X.R.

180—5; 297—195